United States Patent [19]

Okita et al.

[11] Patent Number: 4,657,817
[45] Date of Patent: Apr. 14, 1987

[54] MAGNETIC RECORDING MATERIAL

[75] Inventors: Tsutomu Okita, Kanagawa; Kyoichi Naruo, Shizuoka; Nobuo Tsuji, Kanagawa; Teruo Nakagawa, Aichi; Kiyoshi Murase, Aichi; Takahisa Ogasawara, Aichi, all of Japan

[73] Assignees: Fuji Photo Film Co., Ltd., Kanagawa; Toagosei Chemical Industry Co., Ltd., Tokyo, both of Japan

[21] Appl. No.: 558,673

[22] Filed: Dec. 6, 1983

[30] Foreign Application Priority Data

Dec. 6, 1982 [JP] Japan ............................. 57-212776

[51] Int. Cl.$^4$ ............................................. G11B 5/70
[52] U.S. Cl. .......................... 428/425.9; 252/62.54; 427/44; 427/128; 428/694; 428/900
[58] Field of Search ................. 428/694, 695, 425.9; 427/44, 128, 130, 131, 132; 252/62.54; 360/134–136

[56] References Cited

U.S. PATENT DOCUMENTS

| | | | |
|---|---|---|---|
| 3,871,908 | 3/1975 | Spoor | 427/44 |
| 4,004,997 | 1/1977 | Tsukamoto | 427/44 |
| 4,343,831 | 10/1982 | Tsuji | 427/44 |
| 4,415,630 | 11/1983 | Kubota | 428/694 |
| 4,448,846 | 5/1984 | Chang | 428/480 |
| 4,448,848 | 5/1984 | Okita | 428/694 |
| 4,557,813 | 12/1985 | Heil | 428/425.9 |
| 4,559,118 | 12/1985 | Heil | 428/425.9 |
| 4,560,456 | 12/1985 | Heil | 428/425.9 |
| 4,560,616 | 12/1985 | Okita | 427/44 |
| 4,576,866 | 3/1986 | Okita | 427/44 |

Primary Examiner—Ellis P. Robinson
Attorney, Agent, or Firm—Sughrue, Mion, Zinn Macpeak & Seas

[57] ABSTRACT

There is provided a magnetic recording material produced by coating on a support a magnetic coating composition which contains as main components a magnetic powder and a binder, the binder comprising an urethane acrylate synthesized using a polyester polyol having a particular structure, and by irradiating the resulting magnetic coat with electron beams to harden it. The polyester polyol contains polyhydric alcohol component, 50 mole % or more of which is a dihydric alcohol selected from the class (A) described below, and/or polybasic acid component, 50 mole % or more of which is a dibasic acid selected from the class (B) described below. The urethane acrylate is synthesized under such a condition that it may have two or more of (meth)acryloyl groups per molecule. Thus, improvements in electromagnetic properties and in durability are attained.

Class (A): Alkyl-substituted aliphatic dihydric alcohols, alicyclic dihydric alcohols, and dihydric alcohols made by addition of alkylene oxides to alicyclic or aromatic dihydric alcohols.

Class (B): Alicyclic dicarboxylic acids and aromatic dicarboxylic acids.

11 Claims, No Drawings

MAGNETIC RECORDING MATERIAL

FIELD OF THE INVENTION

The present invention relates to a magnetic recording material, such as a video tape, an audio tape, a computer tape or the like. More specifically, the invention relates to such a material which includes a binder comprised of a synthetic urethane acrylate hardened by irradiation with electron beams.

BACKGROUND OF THE INVENTION

There is a method which has been prevailingly applied to magnetic recording materials, wherein thermoplastic resins, such as vinyl chloride-vinyl acetate resins, vinyl chloride-vinylidene chloride resins, cellulose resins, acetal resins, urethane resins, acrylonitrile-butadiene resins and so on, are employed as their respective binders independently or in combination of two or more thereof, as described in U.S. Pat. Nos. 4,068,040, 3,242,005, 4,352,859, 3,840,400, 4,115,290, 3,681,137, 3,781,210, 4,049,566, 4,336,308, 4,049,871, 4,361,627 and 3,262,813. However, such a method has the defect that sufficient abrasion resistance cannot be imparted to a magnetic layer and thereby, the running course of magnetic tapes is stained.

Further, there have been known a method of utilizing thermosetting resins such as melamine resins, urea resins and the like, and a method of using composition prepared by adding to the aforementioned thermoplastic resins such binders as to undergo chemically a cross-linking reaction, e.g., isocyanate compounds, epoxy compounds or the like. However, these methods suffer from (1) the defect that use of cross-linking binders causes lowering of storage stability of the resinous solution in which a magnetic substance is dispersed, that is, shortening of the pot life of the magnetic coating, which makes it impossible to maintain uniformity of the physical properties of the magnetic coating and in its turn the homogeniety of the magnetic tape, and (2) after coating and drying, a heat processing step is required to harden the coat and therefore, it takes a lot of time to produce finished goods.

With the invention of obviating the above-described defects, methods of producing magnetic recording materials in which acrylic acid ester oligomers and monomers are employed as a binder and wherein the setting thereof is carried out by irradiation with electron beams are disclosed in Japanese Patent Publication No. 12423/'72; Japanese Patent Application (OPI) Nos. 15104/'72, 77433/'75, 86130/'82 and 127926/'82; U.S. Pat. No. 3,871,908; and British Pat. Nos. 2,055,877-B and 2,084,589. However, such methods have failed in ensuring a high state of electromagnetic properties and a high degree of durability to magnetic recording materials.

Recently, high state of electromagnetic properties have been required in particular for magnetic recording materials. Consequently, improvement in the dispersibility of ferromagnetic fine powders has become a more pressing need. Poor dispersibility of ferromagnetic fine powders causes lowering of output, and is responsible for noise.

SUMMARY OF THE INVENTION

As a result of our extensive studies on improvement in conventional techniques, such as the method of using thermoplastic or thermosetting resins, the method of adding chemically cross-linking binders, the method of using binders capable of being hardened through the cross-linking reaction caused by irradiation with electron beams, and so on, the present invention has been achieved.

A primary object of the present invention is to provide a magnetic recording material excellent in electromagnetic properties.

Another object of the present invention is to provide a magnetic recording material having a magnetic layer excellent in durability.

A further object of the present invention is to provide a magnetic recording material which is produced using a magnetic coating composition excellent in storage stability and therefore, capable of being homogeneously maintained.

A still further object of the present invention is to provide a magnetic recording material which does not require any heat processing step for hardening the coat.

The above-described objects are attained with a magnetic recording material produced by coating on a support a magnetic coating composition which contains as main components a magnetic powder and a binder, with the binder being an urethane acrylate synthesized using a polyester polyol having a particular structure, and then by irradiating the resulting coat with electron beams to harden it.

More specifically, the magnetic recording material of the present invention is produced using as a binder an urethane acrylate obtained by reacting a hydroxy group-containing (meth)acrylate, a polyisocyanate and a polyester polyol with one another, wherein one or more of a dihydric alcohol selected from the class (A) described below accounts for 50 mole % or more of the polyhydric alcohol component which constitutes the polyester polyol, and/or one or more of a dibasic acid selected from the class (B) described below accounts for 50 mole % or more of the polybasic acid component which constitutes the polyester polyol, and further wherein each molecule of the urethane acrylate include two or more of (meth)acryloyl groups, and passing through processes of preparing a magnetic coating composition containing this binder and a magnetic fine powder as main components, coating the composition on a support and irradiating the resulting coat with electron beams:

Class (A); Alkyl-substituted aliphatic dihydric alcohols, alicyclic dihydric alcohols, and dihydric alcohols obtained by addition of alkylene oxides to alicyclic or aromatic dihydric alcohols.

Class (B); Alicyclic dicarboxylic acids and aromatic dicarboxylic acids.

That is, the present invention is characterized by using as a binder an urethane acrylate having the above-described particular structure and further, by setting the binder through irradiation with electron beams, whcih brings about an increase with a leap in the dispersibility of a ferromagnetic fine powder, resulting in an improvement in electromagnetic properties and further, in a sharp increase in durability.

DETAILED DESCRIPTION OF THE INVENTION

In the present invention, an acrylate and a methacrylate are collectively called a (meth)acrylate.

The urethane acrylate to be employed in the present invention is obtained by reacting a hydroxyl group-containing (meth)acrylate, a polyisocyanate and a polyester polyol with one another. The reaction is run under a condition at a temperature of from 40° C. to 100° C., preferably from 60° C. to 90° C., in such a manner that firstly the polyester poloyl is added to the polyisocyanate continuously, intermittently or collectively to react with each other and then, the hydroxyl group-containing (meth)acrylate is added thereto continuously, intermittently or collectively to complete the reaction; or in such a manner that the hydroxyl group-containing (meth)acrylate is firstly added to the polyisocyanate continuously, intermittently or collectively to react with each other and then, the polyester polyol is further added thereto continuously, intermittently or collectively to complete the reaction.

Therein, intermittent addition is employed to greater advantage for easy control of the reaction and working facility.

Upon the reaction, it is desirable to prepare the reacting species in such amounts that the number of moles of isocyanate group in the polyisocyanate may be equal to the sum of the numbers of moles of hydroxyl group in the hydroxyl group-containing (meth)acrylate and in the polyester polyol, though it is possible to prepare excess of isocyanate group over hydroxyl group within the range of 10 mole %, or vice versa.

A preferable number average molecular weight of the urethane acrylate ranges from 500 to 100,000, particularly preferably from 1,000 to 20,000.

If the molecular weight is less than 500, the magnetic layer of the magnetic recording material obtained becomes too hard and consequently, it is apt to be cracked by bending, and the magnetic recording material tends to curl due to shrinkage attended by setting of the urethane acrylate after electron beam irradiation. On the other hand, if the molecular weight is more than 100,000, solubilities of the urethane acrylates to solvents tend to become poor and therefore, the urethane acrylate becomes difficult to handle, and what is worse the (meth)acryloyl group concentration becomes low causing a slowdown of the setting speed and in its turn adversely effecting the producing speed.

A suitable polyester polyol to constitute the urethane acrylate of the present invention is one which contains as its polyhydric alcohol component one or more of a dihydric alcohol selected from the class (A) described below in a fraction of 50 mole % or more, preferably 70 mole % or more, and/or as its polybasic acid component one or more of a dibasic acid selected from the class (B) described below in a fraction of 50 mole % or more, preferably 70 mole % or more, and which preferably has a number average molecular weight ranging from 200 to 50,000, more preferably from 500 to 20,000:

Class (A); Alkyl-substituted aliphatic dihydric alcohols preferably having up to 14 carbon atoms (including the carbon atoms of the alkyl group) wherein the alkyl group has preferably up to 6 carbon atoms, alicyclic dihydric alsohols preferably having up to 20 carbon atoms, and dihydric alcohols preferably having up to 24 carbon atoms, formed by addition of alkylene oxides preferably having up to 4 carbon atoms to alicyclic or aromatic dihydric alsohols.

Class (B); Alicyclic dicarboxylic acids preferably having up to 16 carbon atoms and aromatic dicarboxylic acids preferably having up to 16 carbon atoms.

Specific examples of the dihydric alcohols which belong to the class (A) include 2,2-dimethylpropane-1,3-diol, 2,2-diethylpropane-1,3-diol, 2-n-butyl-2-ethylpropane-1,3-diol, propane-1,2-diol, butane-2,3-diol, 2-ethylbutane-1,4-diol, 2-methylpentane-2,4-diol, 3-methylpentane-2,4-diol, 2,2,4-trimethylpentane-1,3-diol, 2,5-dihydroxyhexene-3, cyclohexane-1,2-diol, cyclohexane-1,3-diol, cyclohexane-1,4-diol, cyclohexane-1,4-dimethanol, cyclohexane-1,3-dimethanol, 2,2,4,4-tetramethylcyclobutane-1,3-diol, 1,4-di(hydroxyethoxy)cyclohexane, 2,2-bis(4-hydroxycyclohexyl)propane, bis(4-hydroxycyclohexyl)methane, 2,2-bis(4-hydroxyethoxy-cyclohexyl)propane, 2,2-bis(4-hydroxyethoxy-phenyl)propane, 2,2-bis(4-hydroxyethoxyethoxy-phenyl)propane, 2,2-bis(4-hydroxyethoxy-phenyl)methane, and 2,2-bis(4-hydroxyethoxyethoxy-phenyl)methane. Of these, 2,2-dimethylpropane-1,3-diol and 2-methylpentane-2,4-diol are particularly preferred.

Specific examples of the dibasic acids which belong to the class (B) include hexahydrophthalic acid, tetrahydrophthalic acid, 1-carboxylate-7-methylenecarboxylatenorbornane, 2,6-dicarboxylate-14H-naphthalene, phthalic acid, isophthalic acid, terephthalic acid, naphthalenedicarboxylic acid, bis-methylenecarboxylatebenzene, p,p'-biphenyldicarboxylate, 2,2'-bis(4-carboxyphenyl)propane, 3,6-endomethylene-1,2,3,6-tetrahydrophthalic acid, het acid, the acid anhydrides thereof, the acid chlorides thereof and the dialkyl esters (e.g., dimethyl ester, diethyl ester, etc.) thereof. Of these, isophthalic acid, phthalic acid and tetrahydrophthalic acid are particularly preferred.

Examples of dihydric alochols other than those belonging to the class (A), which make up the above-described polyester polyol, include the dihydric alcohols set forth below. These alcohols may be used in a fraction of less than 50 mole %. Further, when synthesizing polyester polyols having 3 or more of hydroxyl groups, polyhydric (trihydric or above) alcohols set forth below can be used in a fraction of 10 mole % or less.

Specific examples of the dihydric alcohols which can be used include ethylene glycol, trimethylene glycol, tetramethylene glycol, pentamethylene glycol, hexamethylene glycol, heptamethylene glycol, octamethylene glycol, nonamethylene glycol, decamethylene glycol, diethylene glycol, triethylene glycol, and tetraethylene glycol. Ethylene glycol and trimethylene glycol are generally used in practice.

Specific examples of polyhydric alcohols over trihydric ones which can be used include glycerine, trimethylolmethane trimethylolethane, trimethylolpropane, hexane-1,2,6-triol, tris(2-hydroxyethyl)isocyanurate, pentaerythritol, sorbitol, and erythritol. Trimethylolpropane is generally used in practice.

Examples of dibasic acids other than those belonging to the class (B), which make up the above-described polyester polyol, include the dibasic acids set forth below. These acids may be used in a fraction of less than 50 mole %. Further, when synthesizing polyester polyols having 3 or more of hydroxyl groups, polybasic acids over tribasic ones as described below can be used in a fraction of 10 mole % or less.

Specific examples of the dibasic acids which can be used include oxalic acid, malonic acid, succinic acid, glutaric acid, adipic acid, sebacic acid, docedane-2 acid, maleic acid, fumaric acid, itaconic acid, trimethyladipic acid, methyleneglutaric acid, ethylmalonic acid, methylmaleic acid, methylfumaric acid, and the acid anhydrides thereof, the acid chlorides thereof and the dialkyl esters (e.g., dimethyl ester, diethyl ester, etc.) thereof. In general, adipic acid and sebacic acid are used.

Specific examples of the polybasic acids over tribasic ones which can be used include trimellitic acid, methylcyclohexenetricarboxylic acid, aconitic acid, butanetricarboxylic acid, butenetricarboxylic acid, tris(2-carboxylethyl)isocyanurate, pyromellitic acid, the acid anhydrides thereof, the acid chlorides thereof, and the alkyl esters thereof. Trimellitic acid is usually used.

The polyester polyols can be obtained by preparing the above-described polyhydric alcohols and polybasic acids in a reactor and allowing them to undergo esterification via dehydration, or by heating low molecular weight polyester polyols, which have been obtained by dehydrating esterification, under reduced pressure to cause dealcoholation (vacuum polcondensation).

It is desirable to react the polyhydric alcohols and the polybasic acids in such amounts that all of the end groups of the polyester polyol to be obtained by dehydrating esterification may become hydroxyl groups.

More specifically, a polyester polyol having a condensation degree of n is synthesized by the dehydrating esterification reaction of n+1 moles of dihydric alcohol and n moles of dibasic acid. The molar ratio of dihydric alcohol to dibasic acid is preferably from 1.5/1 to 1.8/1.

Suitable examples of polyisocyanates making up the urethane acrylates which can be employed in the present invention include tolylene diisocyanate, diphenylmethane-4,4'-diisocyanate, naphthalene diisocyante, tolidine diisocyanate, hexamethylene diisocyanate, isophorone diisocyanate, xylylene diisocyanate, dicyclohexylmethane-4,4'-diisocyanate, lysine diisocyanate, polymeric isocyanates such as polymethylene polyphenylisocyanate, etc., and adducts of polyols and diisocyanates such as 1:3 adduct of trimethylolpropane and tolylene diisocyanate, etc. Of these, tolylene diisocyanate, diphenylmethane diisocyanate, hexamethylene diisocyanate and isophorone diisocyanate are preferred.

Suitable examples of hydroxyl group-containing (meth)acrylates making up the urethane acrylates which can be used in the present invention include 2-hydroxylethyl (meth)acrylate, 2-hydroxypropyl (meth)acrylate, 3-hydroxypropyl (meth)acrylate, 2-hydroxy-3-phenoxypropyl (meth)acrylate, diethylene glycol mono(meth)acrylate, triethylene glycol mono(-meth)acrylate, tetraethylene glycol mono(meth)acrylate, 2-hydroxy-3-butoxypropyl (meth)acrylate, and so on. Of these, 2-hydroxyethyl (meth)acrylate and 2-hydroxypropyl (meth)acrylate are preferably used.

The binder in the present invention may optionally contain thermoplastic resins and C—C unsaturated bond-containing lower molecular weight compounds having a molecular weight of 500 or less (which are called "monomers" hereinafter) in addition to the setting binder of the present invention. Therein, it is necessary for the urethane acrylate of the present invention, which acts as a setting binder, to be contained in a proportion of 10 wt% or more, preferably 25 wt% or more, more preferably 30 wt% or more, based on the total weight of binder components used. If the proportion of the urethane acrylate is below the above-described value, the dispersibility of magnetic powders into the resulting binder becomes poor. The thermoplastic resins may be added in an amount of 20 wt% or more, preferably 30 wt% or more, and the monomers may be added in an amount of 10 wt% or more, preferably 20 wt% or more, each amount being based on the total weight of binder components.

Suitable thermoplastic resins which can be used together with the setting binder of the present invention are those having a softening point of 150° C. or lower, a number average molecular weight of 10,000 to 200,000 and a polymerization degree of about 200 to 2,000, with the specific examples including vinyl chloride-vinyl acetate copolymer, vinyl chloride-vinyl acetate-vinyl alcohol copolymer, vinyl chloride-vinyl acetate-maleic acid copolymer, vinyl chloride-propionic acid copolymer, vinyl chloride-vinylidene chloride copolymer, vinyl chloride-acrylonitrile copolymer, acrylic acid ester-acrylonitrile copolymer, acrylic acid ester-vinylidene chloride copolymer, acrylic acid ester-styrene copolymer, methacrylic acid ester-acrylonitrile copolymer, methacrylic acid ester-vinylidene chloride copolymer, methacrylic acid ester-styrene copolymer, urethane elastomer, polyvinyl fluoride, vinylidene chlorideacrylonitrile copolymer, butadiene-acrylonitrile copolymer, polyamide resin, polyvinyl butyral, cellulose derivatives (e.g., cellulose acetate butyrate, cellulose diacetate, cellulose triacetate, cellulose propionate, nitrocellulose, etc.), styrene-butadiene copolymer, polyester resin, various kinds of thermoplastic resins of synthetic rubber type (e.g., polybutadiene, polychloroprene, polyisoprene, styrenebutadiene copolymer, etc.), and mixtures of two or more thereof. Of these, vinyl chloride-vinyl acetate copolymer and nitrocellulose are preferably used.

Suitable monomers which can be incorporated in the binder composition are those containing one or more, preferably two or more, carbon-carbon unsaturated bonds per molecule. Specific examples of the monomer containing two or more of C—C unsaturated bonds include acrylates such as diethylene glycol diacrylate, triethylene glycol diacrylate, tetraethylene glycol diacrylate, trimethylolpropane triacrylate and pentaerythritol tetraacrylate; methacrylates such as diethylene glycol dimethacrylate, triethylene glycol trimethacrylate, tetraethylene glycol dimethacrylate, trimethylolpropane trimethacryalte and pentaerythritol tetramethacrylate; and acrylic and methacrylic acid esters of other polyols having two or more of functional groups. Of these, diethyleneglycol diacrylate, trimethylolpropane triacrylate and pentaerythritol tetraacrylate are preferred.

Specific examples of the monomers having one C—C unsaturated bond include acrylic acid, itaconic acid, methyl acrylate and its congeners of alkyl acrylates, styrene and its congeners (e.g., α-methylstyrene, β-chlorostyrene, etc.), acrylonitrile, acrylamide, vinyl acetate, vinyl propionate, N-vinylpyrrolidone, and the compounds as described in *Kanko Jushi Data-shu* (which means the data of photosensitive resins), pp. 235–236, Sogo Kagaku Kenkyusho Co., Ltd. (Dec., 1968). Of these, N-vinylpyrrolidone, vinyl propionate and methyl acrylate are preferably used.

Examples of ferromagnetic powders which can be used in the present invention include ferromagnetic iron oxide fine powder, Co-doped ferromagnetic iron oxide fine powder, ferromagnetic chromium dioxide powder, ferromagnetic alloy fine powder, barium ferrite, etc. The above-described ferromagnetic iron oxide and ferromagnetic chromium dioxide particles preferably have an axial ratio of about 2:1 to 20:1, particularly 5:1 or above, and an average length in the range of about 0.2 to about 2.0 μm. The above-desribed ferromagnetic alloy powder is one which contains a metal component in a proportion of about 75 wt% or more, with about 80 wt% or more of the metal component being at least one ferromagnetic metal (e.g., Fe, Co, Ni, Fe-Co, Fe-Ni, Co-Ni or Fe-Co-Ni) and the particle length is about 1.0 μm or less. The ferromagnetic powders are generally used in an amount of 2 to 7 parts by weight, preferably 3 to 6 parts by weight per part by weight of the total binder components.

The magnetic coating composition to be employed in the present invention may contain organic solvents. The solvent is generally used in an amount ot 2 to 8 times the total weight of binder components used. Such organic solvents can be selected properly from ketones such as acetone, methyl ethyl ketone, methyl isobutyl ketone, cyclohexanone, etc.; esters such as methyl acetate, ethyl acetate, butyl acetate, ethyl lactate, glycol acetate monoethyl ether, etc.; glycol ethers such as ether, glycol dimethyl ether, glycol monoethyl ether, dioxane, etc.; aromatic hydrocarbons such as benzene, toluene, xylene, etc.; chlorinated hydrocarbons such as methylene chloride, ethylene chloride, carbon tetrachloride, chloroform, ethylene chlorhydrin, dichlorobenzene, etc.; and so on.

In addition, the magnetic coating composition to be employed in the present invention may contain as additives a lubricant, an abrasive, a rust preventive, an antistatic agent and so on. Useful lubricants include saturated or unsaturated higher fatty acids, fatty acid esters, higher fatty acid amides, higher alcohols, silicone oils, mineral oils, vegetable oils, fluorine-containing compounds and the like. These lubricants may be added to the magnetic coating composition at the time of preparation thereof, or they may be coated or sprayed on the surface of the magnetic layer in a form of solution in an organic solvent or in their original condition after drying the magnetic layer, the processing of surface-smoothening the magnetic layer, or the processing of hardening the magnetic layer by electron-beam irradiation.

Suitable materials which can be used for non-magnetic support on which the magnetic coating composition is to be coated include polyesters such as polyethylene terephthalate, polyethylene 2,6-naphthalate, etc.; polyolefins such as polyethylene, polypropylene, etc.; cellulose derivatives such as cellulose triacetate, etc.; other synthetics such as polycarbonate, polyimide, polyamideimide, etc.; and depending on the usage, non-magnetic metals such as Au, Co, Sn, Zn, etc.; and papers such as paper, polyolefin-coated or -laminated paper, etc.

The non-magnetic support may be in any form, e.g., a film, a tape, a sheet, a disc, a card, a drum, etc., and various mateirals are appropriately selected depending on the form employed.

In addition, the non-magnetic support may be back-coated (i.e., coated with a backing layer) on the side opposite the magnetic layer for the purposes of preventing generation of static charges, transfer or wow and flutter, improving the strength of the magnetic recording material, and matting the back side thereof.

Electron-beam accelerators which can be employed in the present invention include those of scanning type, double scanning type, curtain beam type, and broad beam curtain type.

It is to be desired for characteristics of electron beams that the above-described electron-beam accelerators should be used under such a condition that an acceleration voltage ranges from 100 to 1,000 kV, preferably 150 to 300 kV, and an absorption dose may be controlled to the range of 0.5 to 20 megarad, preferably 3 to 15 magarad. If the acceleration voltage is less than 100 kV, insufficiency of permeation energy is brought about, whereas if it is increased beyond 1,000 kV, energy efficiency in using for polymerization is decreased, and it is uneconomical to set the acceleration voltage to such high values. On the other hand, if the absorption dose is less than 0.5 magarad, the setting reaction is incomplete and therefore, the strength of the resulting magnetic layer becomes insufficient, whereas if it is increased beyond 20 megarad, energy efficiency used for setting is decreased and further, the irradiated material becomes hot. Such an exothermic phenomenon is undesirable especially for plastic supports because they are deformed thereby.

There is no particular limitation on the thickness of the magnetic layer of the present invention, but it is generally from 2 to 8 μm, preferably 3 to 6 μm.

The magnetic recording material of the present invention has been found to have excellent electromagnetic properties and high abrasion resistance, and to make the heat treatment step for hardening the coated layer unnecessary by virtue of adoption of electron-beam irradiation. It has also been found that the dispersibility of magnetic powders in magnetic coating composition is improved, and the magnetic coating compositions have excellent storage stability.

The present invention will now be illustrated in more detail by reference to the following reference examples, examples and comparative examples. Additionally, in the foollowing reference examples, examples and comparative examples, all parts are by weight unless otherwise indicated. The scope of the invention is not limited to these Examples.

REFERENCE EXAMPLE 1

438 g (3 moles) of adipic acid and 416 g (4 moles) of neopentyl glycol were placed in a 2-liter flask, and heated to 180° C. and stirred as nitrogen gas was passed therethrough, thus achieving dehydrating esterification to obtain polyneopentyladipate having a mean molecular weight of 746.

Next, 278 g (1.6 moles) oof tolylene diisocyanate was placed in a 1-liter flask wherein the atmosphere had been replaced with $N_2$, and heated to 70° C. Holding the temperature inside the flask at 70° C., 597 g (0.8 mole) of the neopentyladipate obtained above was added intermittently thereto by 64 g portion each for about 10 times and further thereto, 186 g (1.6 moles) of 2-hydroxyethyl acrylate was also added intermittently by 37 g portion each for 5 times. Heating and stirring were continued at 70° C. for an additional 2 hours. Thus, viscous urethane acrylate was obtained.

The urethane acrylate obtained had a mean molecular weight of 1,300 and contained, on the average, two acryloyl group per molecule.

REFERENCE EXAMPLE 2

332 g (2 moles) of isophthalic acid and 270 g (3 moles) of tetramethylene glycol were placed in a 1-liter flask, and heated to 180° C. with stirring as nitrogen gas was passed therethrough. Holding these conditions, dehydrating esterification was accomplished in 8 hours. Then, 0.6 (0.1 wt%) of tetrabutyl titanate (abbreviated as "TBT" hereinafter) was added as a catalyst to the ester obtained above, and the resulting system was heated up to 200° to 250° C. under reduced pressure of 2 mm Hg and kept there for 6 hours to effect vacuum polycondensation and consequently, to allow 72 g (0.8 mole) of tetramethylene glycol to effuse. Thus, polyester polyol having a mean molecular weight of 2,290 was obtained.

Next, 52.2 g (0.3 mole) of tolylene diisocyanate and 533 g of methyl ethyl ketone were placed in a 2-liter flask wherein the atmosphere had been replaced with dried nitrogen gas, and heated to 70° C. 458 g (0.2 mole) of the polyester polyol obtained above was fused by heating, and added intermittently in five parts to the resulting solution as the temperature of the reaction system was kept at 70° C. Further thereto, 23.2 g (0.2 mole) of 2-hydroxyethyl acrylate was added intermittently in two parts. Heating was continued for an additional two hours with stirring so as to keep the temperature at 70° C. Thus, a 50% methyl ethyl ketone solution of an urethane acrylate was obtained.

The urethane acrylate obtained had a mean molecular weight of 5,334 and two acrylol groups per molecule.

REFERENCE EXAMPLE 3

296 g (2 moles) of orthophthalic acid anhydride, 156 g (1.5 moles) of neopentyl glycol and 93 g (1.5 moles) of ethylene glycol were placed in a 1-liter flask, and heated to 180° C. with stirring as nitrogen gas was passed therethrough. Holding these conditions, dehydrating esterification was accomplished in 6 hours. Then, 0.5 g (0.1 wt%) of TBT was added as a catalyst to the ester obtained above, and the resulting system was heated up to 200° to 250° C. under reduced pressure of 2 mm Hg and kept there for 4 hours to effect vacuum polycondensation and as a result thereof, to allow 54 g of glycolic component to effuse. Thus, polyester polyol having a hydroxyl group value of 0.9 meg (mili equivalent) per gram, and a mean molecular weight of 2,200 was obtained.

Next, 53.4 g (0.24 mole) of isophorone diisocyanate and 501 g of methyl ethyl ketone were placed in a 2-liter flask wherein the atmosphere had been replaced with dried nitrogen gas, and heated to 70° C. 440 g (0.2 mole) of the polyester polyol obtained above was heated, and added intermittently in five parts to the resulting solution as the reaction system was kept at 70° C. Further thereto, 7.7 g (0.07 mole) of 2-hydroxyethyl acrylate was added in two parts. Heating was continued for an additional 3 hours with stirring so as to kept the reaction system at 70° C. Thus, a 50% methyl ethyl ketone solution of an urethane acrylate was obtained.

The urethane acrylate obtained had a mean molecular weight of 14,500 and two acryloyl groups per molecule.

REFERENCE EXAMPLES 4, 5, 6 AND 12

Urethane acrylates were obtained using starting materials set for in Table 1 in the same manner as employed in Reference Example 1 (called "Synthesis Method I").

REFERENCE EXAMPLES 7, 8 AND 13

Urethane acrylates were obtained using staring materials set forth in Table 1 in the same manner as employed in Reference Example 2 (called "Synthesis Method II).

REFERENCE EXAMPLES 9, 10 AND 11

Urethane acrylates were obtained using starting materials set forth in Table 1 in the same manner as employed in Reference Example 3 (called "Synthesis Method III").

TABLE 1

| | Synthesis of Polyester Polyol | | | | | |
|---|---|---|---|---|---|---|
| | Polyhydric Alcohol | | Polybasic Acid | | | |
| Reference Example No. | Kind | Amt. Added (mol.) | Kind | Amt. Added (mol.) | Synthesis Method | Number Average Mol. Wt. |
| 4 | 2,4-Dihydroxy-2-methylpentane | 4 | Adipic Acid | 3 | I | 798 |
| 5 | Neopentyl Glycol | 3 | Adipic Acid<br>o-Phthalic Acid Anhydride | 1<br>1 | I | 552 |
| 6 | Neopentyl Glycol<br>Trimethylolpropane | 3.7<br>0.3 | Adipic Acid | 3 | I | 755 |
| 7 | Tetramethylene Glycol | 3 | Hexahydrophthalic Acid Anhydride | 2 | II | 2500 |
| 8 | Hexanediol | 3 | Tetrahydro phthalic Acid Anhydride | 2 | II | 3000 |
| 9 | Cyclohexane-1,2-diol<br>Ethylene Glycol | 2<br>1 | Adipic Acid | 2 | III | 4000 |
| 10 | Cyclohexane-1,4-dimethanol<br>Ethylene Glycol | 2<br>1 | Adipic Acid | 2 | III | 3500 |
| 11 | 2,2-bis(4-hydroxyethoxyphenyl)propane<br>Ethylene Glycol | 2<br>1 | Tetrahydrophthalic Acid<br>Sebacic Acid | 1<br>1 | III | 2500 |
| 12 | Tetramethylene Glycol | 4 | Adipic Acid | 3 | I | 690 |
| 13 | Ethylene Glycol | 3 | Sebacic Acid | 2 | II | 2000 |

| | Synthesis of Urethane Acrylate | | | | | | |
|---|---|---|---|---|---|---|---|
| | Polyester | Polyisocyanate | | Hydroxyl-contg. (Meth)acryate | | Urethane Acrylate | |
| Reference Example No. | Polyol Amt. Added (mol.) | Kind | Amt. Added (mol.) | Kind | Amt. Added (mol.) | Number Average Mol. Wt. | Number of Acryloyl per Molecule |

TABLE 1-continued

| | | | | | | | |
|---|---|---|---|---|---|---|---|
| 4 | 0.5 | Tolylene Diisocyanate | 1 | 2-Hydroxyethyl Acrylate | 1 | 1400 | 2 |
| 5 | 0.5 | Tolylene Diisocyanate | 0.75 | 2-Hydroxyethyl Acrylate | 0.5 | 1900 | 2 |
| 6 | 0.5 | Tolylene Diisocyanate | 1 | 2-Hydroxyethyl Acrylate | 1 | 1300 | 2.3 |
| 7 | 0.15 | Tolylene Diisocyanate | 0.3 | 2-Hydroxyethyl Acrylate | 0.3 | 3000 | 2 |
| 8 | 0.1 | Tolylene Diisocyanate | 0.2 | 2-Hydroxyethyl Acrylate | 0.2 | 3600 | 2 |
| 9 | 0.1 | Hexamethylene Diisocyanate | 0.2 | 2-Hydrosyethyl Acrylate | 0.2 | 4600 | 2 |
| 10 | 0.1 | Tolylene Diisocyanate | 0.2 | 2-Hydroxyethyl Acrylate | 0.2 | 4000 | 2 |
| 11 | 0.2 | Diphenyl-methan Diisocyanate | 0.3 | 2-Hydroxyethyl Acrylate | 0.2 | 6000 | 2 |
| 12 | 0.5 | Tolylene Diisocyanate | 1 | 2-Hydroxyethyl Acrylate | 1 | 1300 | 2 |
| 13 | 0.2 | Tolylene Diisocyanate | 0.4 | 2-Hydroxyethyl Acrylate | 0.4 | 2600 | 2 |

EXAMPLE 1

| Magnetic Coating Composition | Parts |
|---|---|
| Co-containing $\gamma$-$Fe_2O_3$ (Co: 3 atomic %; Hc: 580 Oe; particle size: $0.5 \times 0.06 \times 0.06$ $\mu m^3$) | 400 |
| Urethane Acrylate obtained in Reference Example 1 (Acrylated condensates of adipic acid, neopentyl glycol and tolylene diisocyanate) | 100 |
| Stearic Acid | 1 |
| Butyl Stearate | 1 |
| Methyl Ethyl Ketone/Cyclohexane (1/1) | 600 |

The above-described composition was placed in a ball mill, and kneaded and dispersed for 50 hours. This magnetic coating composition was coated on 15 $\mu m$-thick polyethylene terephthalate film in a dry thickness of 5 $\mu m$ using a doctor blade. This was oriented by means of a cobalt magnet, and dried to remove the solvent therefrom (for 1 minute at 100° C.). Then, it was subjected to the surface-smoothening processing using 5-step calendering which comprised passing the magnetic recording material between a group of two rolls of a cotton roll and a surface roll (under conditions that a roll temperature was 40° C. and a between-roll pressure was 50 kg/cm²).

Next, the thus processed magnetic recording material was irradiated with electron beams having a beam current of 5 mA, an acceleration voltage of 160 kV and an absorption dose of 10 Mrad. The resulting magnetic reocrding material was named Sample No. 1.

EXAMPLES 2 TO 11, AND COMPARATIVE EXAMPLES 1 AND 2

Sampels were obtained using the same magnetic coating compositions as employed in Example 1 except that the binder of Example 1 was changed to those set forth in Tabel 2 respectively. The resulting magnetic recording materials were subjected to the same processings as employed in Example 1.

TABLE 2

| | Binder | Sample No. |
|---|---|---|
| Example 2 | Urethane Acrylate of Reference Example 4 | 2 |
| Example 3 | Urethane Acrylate of Reference Example 9 | 3 |
| Example 4 | Urethane Acrylate of Reference Example 10 | 4 |
| Example 5 | Urethane Acrylate of Reference Example 11 | 5 |
| Example 6 | Urethane Acrylate of Reference Example 7 | 6 |
| Example 7 | Urethane Acrylate of Reference Example 2 | 7 |
| Example 8 | Urethane Acrylate of Reference Example 8 | 8 |
| Example 9 | Urethane Acrylate of Reference Example 3 | 9 |
| Example 10 | Urethane Acrylate of Reference Example 5 | 10 |
| Example 11 | Urethane Acrylate of Reference Example 6 | 11 |
| Comparative Example 1 | Urethane Acrylate of Reference Example 12 | 12 |
| Comparative Example 2 | Urethane Acrylate of Reference Example 13 | 13 |

EXAMPLES 12, 13 AND 14

Samples were obtained using the same magnetic coating compositions as employed in Example 1 except that the magnetic substance of Example 1 was changed to those set forth in Table 3 respectively. The resulting magnetic recording materials were subjected to the same processings as in Example 1.

TABLE 3

| | Magnetic Substance | Sample No. |
|---|---|---|
| Example 12 | Fe—Co alloy Powder (Atomic ratio: 90/10; Hc: 600 Oe; particle size: $0.2 \times 0.03 \times 0.03$ $\mu m^3$) | 14 |
| Example 13 | Co-containing $FeO_x$ (x: 1.42; Co content: 1.5 atomic %; Hc: 620 Oe; particle size: $0.4 \times 0.06 \times 0.06$ $\mu m^3$) | 15 |
| Example 14 | Te-denatured $CrO_2$ (Te content: 1 atomic %; Hc: 550 Oe; particle size: $0.9 \times 0.13 \times 0.13$ $\mu m^3$) | 16 |

The measurements of the video sensitivity, the video signal to noise ratio and the abrasion resistance of the above-described samples each were carried out. The data for the respective samples were determined by recording 50% set-up gray signals using a video tape recorder (model NV-8200 made by Matsushita Eelctric Industrial Co., Ltd.), and masuring noise using a S/N meter (model 925-C made by Shibasoku Co.). Both the video sensitivity and the video signal to noise ratio (abbreviated as S/N ratio) set forth in Table 4 are relative values evaluated taking those of Sample 1 as 0dB, and the abrasion resistance is evaluated by taking the initial output of each sample as a standard (0 dB), and measuring any decrease in output caused by repeated running 100 times. Characteristics of the samples obtained are shown in Table 4 below.

TABLE 4

| Sample No. | Video Sensitivity (dB) | Video S/N Ratio (dB) | Abrasion Resistance (dB) |
| --- | --- | --- | --- |
| 1 | ±0 | ±0 | −0.3 |
| 2 | +0.2 | +0.1 | −0.4 |
| 3 | −0.1 | ±0 | −0.5 |
| 4 | +0.5 | +0.3 | −0.3 |
| 5 | −0.3 | −0.2 | −0.4 |
| 6 | −0.3 | −0.1 | −0.4 |
| 7 | +0.3 | +0.1 | −0.5 |
| 8 | −0.1 | ±0 | −0.6 |
| 9 | +0.1 | +0.2 | −0.4 |
| 10 | +0.1 | +0.1 | −0.4 |
| 11 | −0.2 | −0.1 | −0.5 |
| 12 (Comparative Example) | −3.0 | −2.0 | −1.8 |
| 13 (Comparative Example) | −3.5 | −3.1 | −2.1 |
| 14 | +0.5 | +0.2 | −0.6 |
| 15 | +0.8 | +0.3 | −0.7 |
| 16 | −0.3 | ±0 | −0.5 |

As can be seen from the results shown in Table 4, the magnetic recording materials produced in accordance with embodiments of the present invention (Samples No. 1 to No. 11, and Samples No. 14 to No. 16) are superior to the comparative materials (Samples No. 12 and No. 13) with respect to characteristics relating to the video sensitivity, the video S/N ratio and the abrasion resistance.

While the invention has been described in detail and with reference to specific embodiments thereof, it will be apparent to one skilled in the art that various changes and modifications can be made therein without departing from the spirit and scope thereof.

What is claimed is:

1. A magnetic recording material comprising:
a support base having thereon;
a magnetic layer comprised of a magnetic powder dispersed in a setting binder, the binder being hardened by irradiation with electron beams, the binder being a urethane acrylate having a number average molecular weight of from 500 to 100,000 obtained by reacting a hydroxyl group-containing (meth)acrylate, a polyisocyanate and a polyester polyol with one another, wherein a dihydric alcohol selected form class (A) described below accounts for 50 mole% or more of the polyhydric alcohol component which constitutes the polyester polyol, and further wherein each molecule of said urethane acrylate includes two or more (meth)acryloyl groups and class (A) is selected from the group consisting of alkyl-substituted aliphatic dihydric alcohols, alicyclic dihydric alcohols, and dihydric alcohols made by addition of alkylene oxides to alicyclic or aromatic dihydric alcohols, wherein the polyester polyol comprises a polyhydric alcohol component which contains 0 to 10 mole% of a polyhydric alcohol component having 3 or more hydroxyl groups.

2. A magnetic recording material as claimed in claim 1, wherein the urethane acrylate is present in the binder in an amount of 10 wt% or more based on the total weight of the binder.

3. A magnetic recording material as claimed in claim 2, wherein the urethane acrylate is present in an amount of 25 wt% or more based on the total weight of the binder.

4. A magnetic recording material as claimed in claim 1, wherein the electron beams have an acceleration voltage in the range of 150 to 300 kV and apply an absorption dose in the range of 3 to 15 megarad.

5. A magnetic recording material as claimed in claim 1, wherein said urethane acrylate has a number average molecular weight of from 1,000 to 20,000.

6. A magnetic recording material as claimed in claim 5, wherein said dihydric alcohol selected from class (A) accounts for 70 mole% or more of the polyhydric alcohol component.

7. A magnetic recording material as claimed in claim 6, wherein said dihydric alcohol selected from class (A) is an alkyl substituted aliphatic dihydric alcohol having up to 14 carbon atoms, including the carbon atoms of the alkyl group, where the alkyl group has up to 6 carbon atoms, alicyclic dihydric alcohols having up to 20 carbon atoms and dihydric alcohols having up to 24 carbon atoms formed by the addition of alkylene oxides having up to 4 carbon atoms to alicyclic or aromatic dihydric alcohols.

8. A magnetic recording medium as claimed in claim 7, wherein said polyisocyanate is selected from the group consisting of tolylene diisocyanate, diphenylmethane-4,4'-diisocyanate, naphthalene diisocyanate, tolidine diisocyanate, hexamethylene diisocyanate, isophorone diisocyanate, xylylene diisocyanate, dicyclohexylmethane-4,4'-diisocyanate, lysine diisocyanate, polymeric isocyanates and adducts of polyols and diisocyanates.

9. A magnetic recording medium as claimed in claim 8, wherein said hydroxyl group-containing (meth)acrylate is selected from the group consisting of 2-hydroxylethyl (meth)acrylate, 2-hydroxypropyl (meth)acrylate, 3-hydroxypropyl (meth)acrylate, 2-hydroxy-3-phenoxypropyl (meth)acrylate, diethylene glycol mono(meth)acrylate, triethylene glycol mono(meth)acrylate, tetraethylene glycol mono(meth)acrylate and 2-hydroxy-3-butoxypropyl (methy)acrylate.

10. A magnetic recording medium as claimed in claim 9, wherein said urethane acrylate is the reaction product of polyneopentyladipate, tolylene diisocyanate and 2-hydroxyethyl acrylate.

11. A magnetic recording material as claimed in claim 1, wherein said dihydric alcohol is selected from the group consisting of 2,2-dimethylpropane-1,3-diol; 2-methylpentane-2,4-diol; cyclohexane-1,2-diol; cyclohexane-1,4-dimethanol and 2,2-bis(4-hydroxyethoxylphenyl)propane.

* * * * *